Oct. 24, 1933.  F. L. HENNING  1,931,896

THERMOSTATIC FLUID MIXING VALVE

Filed March 30, 1933   2 Sheets-Sheet 2

Inventor:
Francis L. Henning
by Franklin E. Low
Atty.

Patented Oct. 24, 1933

1,931,896

UNITED STATES PATENT OFFICE 1,931,896

THERMOSTATIC FLUID MIXING VALVE

Francis L. Henning, Charlestown, Mass., assignor of one-half to Jacob A. Stryker, Arlington, Mass.

Application March 30, 1933. Serial No. 663,515

14 Claims. (Cl. 236—12)

This invention relates to improvements in valves and particularly to a thermostatically controlled automatic type valve for mixing hot and cold water of unknown temperatures and for discharging the resulting mixture therefrom at predetermined temperatures or at temperatures which may be varied as desired.

Another object of the invention is to provide a valve actuating mechanism of novel construction including a simple and effective mechanism for controlling the temperature of the water discharged from the valve irrespective of the temperature of the hot and cold water as it is supplied to the valve.

Another object of the invention is to provide a temperature control mechanism which may also be utilized as a means for shutting off both the hot and cold water supplied to the valve, when it is so desired.

Still another object of the invention is to provide a valve which will operate effectively to prevent water from being discharged at a higher temperature than that indicated upon the dial of the control mechanism, thereby preventing accidental scalding when the device is utilized in connection with a shower bath.

Finally, another object of the invention is to provide a valve of simple construction and operation and capable of affecting a saving of the hot water utilized, said valve having a minimum number of parts embodied therein which can be produced at a minimum cost.

The invention consists in a valve as set forth in the following specification and particularly as pointed out in the claims thereof.

Referring to the drawings:—

Like numerals refer to like parts throughout the several views of the drawings.

Figure 1:
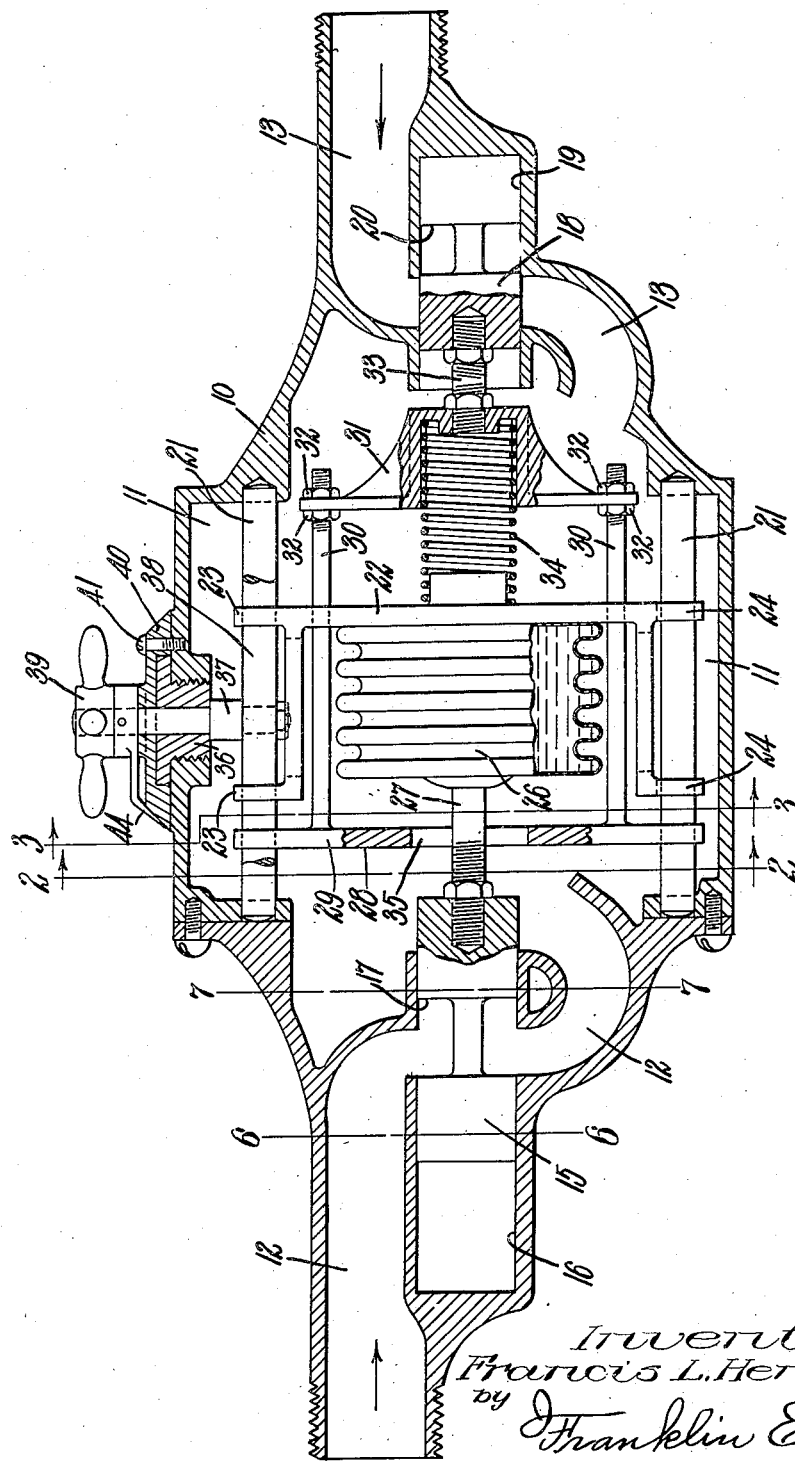
Fig. 1 represents a vertical longitudinal sectional elevation of the valve.
Figure 2:
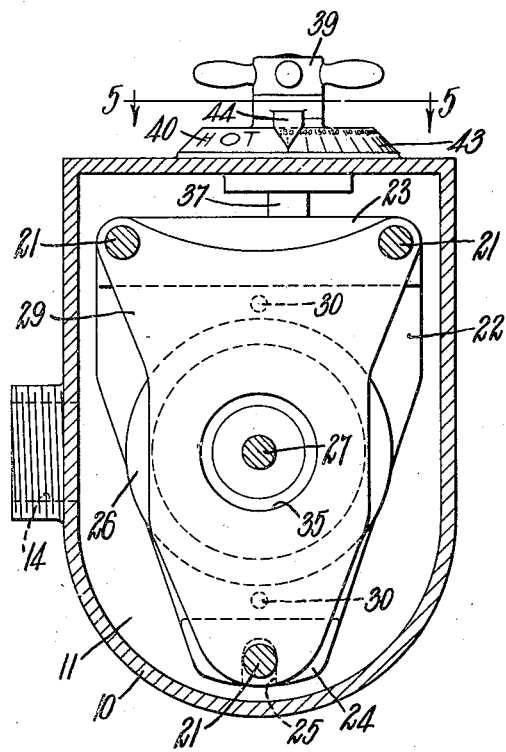
Fig. 2 is a transverse sectional elevation taken on the line 2—2 of Fig. 1, looking in the direction of the arrows on said line.
Figure 3:
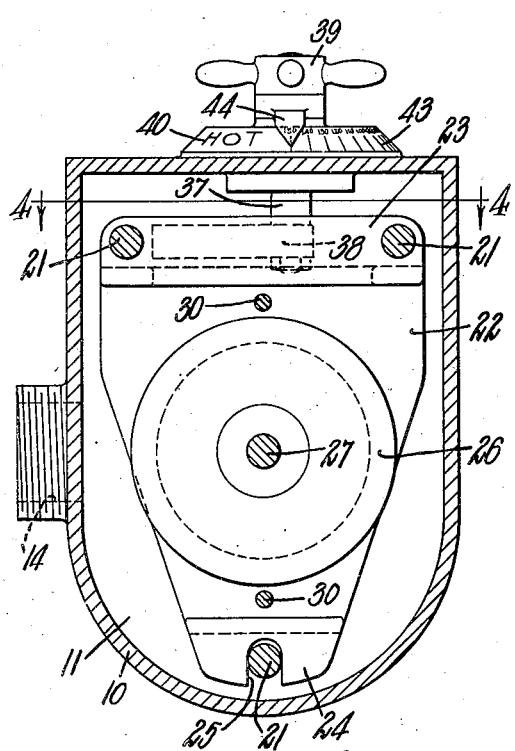
Fig. 3 is a transverse sectional elevation taken on the line 3—3 of Fig. 1, looking in the direction of the arrows on said line.

In the drawings, 10 represents a casing which may be constructed of any number of parts necessary for convenient production, and in order that the various parts of the mechanism may be assembled therein. The casing 10 embodies therein a mixing chamber 11 for hot and cold water, and an inlet passage 12 for hot water is provided in said casing at one end thereof and communicates with said mixing chamber, while an inlet passage 13 for cold water is provided at the other end of said casing and also communicates with the mixing chamber. A discharge passage 14 for the mixture of hot and cold water is provided at one side of the casing 10, although this discharge passage may be located at the bottom of the casing if it is so desired.

A cylindrical inlet valve 15 is slidably mounted in guideways 16 provided in the casing 10 and intersects the inlet passage 12 in a manner to control the flow of hot water through said passage. The valve 15 has a peripheral groove 17 formed therein. A cylindrical inlet valve 18 is slidably mounted in guideways 19 provided in the casing 10 and intersects the inlet passage 13 in a manner to control the flow of the cold water through said passage. The valve 18 has a peripheral groove 20 formed therein. The valves 15 and 18 are positioned in axial alignment with each other at opposite ends of the casing 10.

A plurality of guide rods 21 are mounted in the casing 10 and are positioned parallel to the axes of the valves 15 and 18. Two of the guide rods 21 are positioned adjacent to the top of the casing 10 and upon opposite sides of the mixing chamber 11, while the other of said rods is located adjacent to the bottom of the casing 10 and centrally between the sides thereof.

Slidably mounted upon the rods 21 is a carrier 22 having upper flange portions 23 and lower flange portions 24 embodied therein. The carrier 22 is supported entirely upon the two upper rods 21 and the latter project through the upper flanges 23. The lower guide rod 21 projects through slots 25 provided in the lower flanges 24 of the carrier 22 contacting with the sides only of said slots, thereby preventing any possible binding action between the carrier 22 and rods 21 during the sliding movement of the carrier upon the upper rods 21. A bellows type thermostatic element 26 of well-known form is mounted upon the carrier 22 in axial alignment with the valves 15 and 18. The thermostatic element 26 is filled with a suitable volatile fluid which causes it to expand and contract in a well-known manner. The thermostatic element 26 is directly connected to the inlet valve 15 by means of a valve stem 27.

Slidably mounted upon all of the guide rods 21 is an actuating device 28 embodying therein a plate 29 which is interposed between the thermostatic element 26 and the inlet valve 15 and has sliding engagement with the rods 21. The actuating device 28 also has a pair of rods 30 embodied therein which project laterally from a face of the plate 29. The rods 30 project through and have sliding engagement with the carrier 22. A yoke 31 is adjustably fastened at its opposite ends to the rods 30 by means of nuts 32. A valve stem 33 connects the yoke 31 with the inlet valve 18. A helical compression spring 34 is interposed between the carrier 22 and yoke 31. An opening 35 is provided in the plate 29 in order that the valve stem 27 may pass therethrough.

Figure 5:
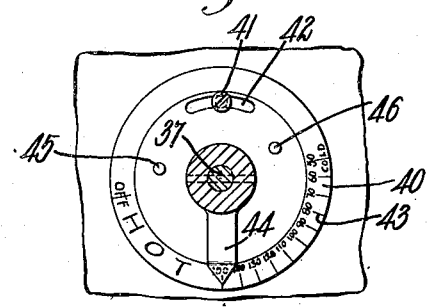
Fig. 5 is a horizontal sectional plan view taken on the line 5—5 of Fig. 2.

The mechanism for regulating and controlling the temperature of the water delivered from the valve is as follows:—Mounted in the top of the casing 10 is a bushing 36 in which a stud 37 is rotatably mounted. A cam 38, consisting of a circular disc eccentrically secured to the stud 37 to rotate in unison therewith, is positioned between the upper flanges 23 of the carrier 22, and the periphery of said cam is always in contact with the oppositely disposed faces of said flanges. A handle 39 is rigidly secured to the upper portion of the stud 37. A dial 40 surrounds the stud 37 and is adjustably secured to the top of the casing 10 by means of a screw 41 which projects through a slot 42 provided in the dial. Suitable graduations 43 indicating degrees of temperature are provided upon the dial 40. An indicator 44 is rigidly secured to the stud 37 to rotate in unison therewith and to co-operate with the graduations 43 of the dial. Stop pins 45 and 46 are provided upon the dial 40 and indicate off and cold positions respectively of the indicator, see Fig. 5.

The general operation of the valve hereinbefore specifically described is as follows:—In the various figures of the drawings the inlet valve 15 for the hot water is illustrated open to its maximum limit and the inlet valve 18 for the cold water is closed to its maximum limit and the control mechanism is set for water to be discharged from the valve at 150°. With conditions as stated, the hot water contacting with the thermostatic element 26 will cause said element to expand axially toward the left in Fig. 1 and if the water be of extreme heat the left hand extremity of the thermostatic element will contact with the plate 29 of the actuating device 28 causing the latter to move toward the left in Fig. 1 until the inlet valve 18 for the cold water has been opened to admit said water in sufficient quantity to reduce the temperature of the hot water to the desired degree, after which the flow of water through the valve will remain constant at this degree provided the temperature of the incoming hot water does not fall below 150°.

Figure 4:
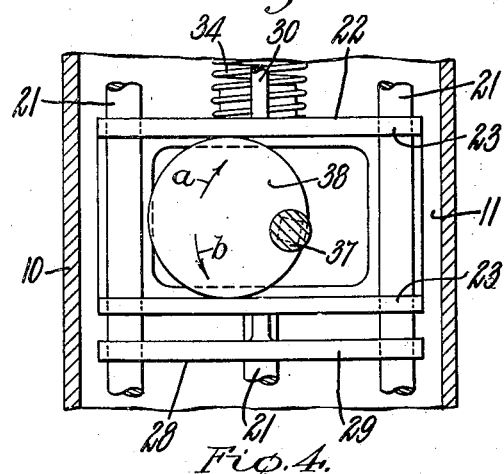
Fig. 4 is a horizontal sectional plan view taken on the line 4—4 of Fig. 3.
Figures 6, 7:
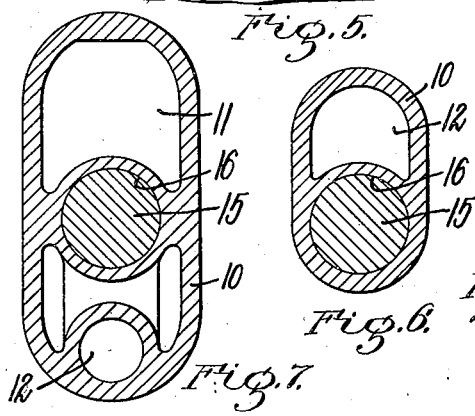
Fig. 6 is a transverse section taken on the line 6—6 of Fig. 1.
Fig. 7 is a transverse section taken on the line 7—7 of Fig. 1.

Water at temperatures between approximately 150° and 50° may be obtained by rotating the handle 39 in a counterclockwise direction, thereby moving the cam 38 in the direction of the arrow b, Fig. 4, until the indicator 44 contacts with the stop pin 46. At this time the hot water valve 15 will be closed to its maximum limit and the cold water valve 18 will be open to its maximum limit. By rotating the handle in a clockwise direction until the indicator contacts with the stop pin 45, the cam 38 will be rotated in the direction of the arrow a, Fig. 4, and both the hot and cold water valves will be closed to their maximum limits, thereby stopping the flow of water through the valve. During this clockwise movement of the handle 39 the cam 38 will move the carrier 22 toward the right, Fig. 1, carrying with it the thermostatic element 26 and hot water inlet valve 15 until the latter entirely closes the hot water inlet passage 12. During the movement of the carrier 22 toward the right the actuating device 28 will also be moved toward the right carrying with it the cold water inlet valve 18 until the inlet passage 13 is closed. This movement of the actuating device 28 is transmitted from the carrier 22 to the actuating device through the spring 34 which is interposed between the carrier 22 and yoke 31.

Whenever the handle 39 is moved in a counterclockwise direction to reduce the temperature of the hot water entering the valve, the cam 38 is permitted to move the carrier 22, thermostatic element 26 and hot water inlet valve 15 a certain amount before the inlet valve 15 starts to close the passage 12 for the hot water and during the first part of this counterclockwise movement the inlet valve 18 for the cold water remains closed. The inlet valve 18 does not start to open the passage 13 until the cam 38 has forced the carrier 22 toward the left in Fig. 1 a sufficient amount for the left hand flanges 23 and 24 of said carrier to contact with the plate 29 of the actuating device 28, after which the carrier 22 and actuating device 28 will move in unison and the valves 15 and 18 will then move in unison and the inlet passage 12 for the hot water will gradually close at the same time that the inlet passage 13 for the cold water is gradually opening.

I claim:

1. A valve of the character described having, in combination, a mixing chamber provided with inlet passages for relatively hot and cold fluids and a discharge passage for a mixture of the same, a valve for each inlet passage, means to automatically actuate both of said valves, and means to control the operation of said valve actuating means, whereby fluid of predetermined temperatures may be discharged from the mixing chamber or both of said valves opened or closed as desired.

2. A valve of the character described having, in combination, a mixing chamber provided with inlet passages for relatively hot and cold fluids and a discharge passage for a mixture of the same, axially aligned valves for said inlet passages, and a thermostatic element within said chamber adapted to actuate both of said valves and interposed therebetween in axial alignment therewith.

3. A valve of the character described having, in combination, a mixing chamber provided with inlet passages for relatively hot and cold fluids and a discharge passage for a mixture of the same, axially aligned valves for said inlet passages, a thermostatic element within said chamber adapted to actuate both of said valves and interposed therebetween in axial alignment therewith, and means to vary the position of said thermostatic element whereby fluid of different temperatures may be discharged from the mixing chamber.

4. A valve of the character described having, in combination, a mixing chamber provided with inlet passages for relatively hot and cold fluids and a discharge passage for a mixture of the same, axially aligned valves for said inlet passages, a thermostatic element interposed between said valves in axial alignment therewith, means to operatively connect said thermostatic element to said valves to actuate the latter in the same direction simultaneously, and means to vary the position of the thermostatic element whereby fluid of predetermined temperature may be discharged from the mixing chamber.

5. A valve of the character described having, in combination, a mixing chamber provided with inlet passages for relatively hot and cold fluids and a discharge passage for a mixture of the same, axially aligned valves for said inlet passages, a thermostatic element interposed between said valves in axial alignment therewith, means to operatively connect said thermostatic element to said valves to actuate the latter in the same direction, and means to vary the position of the thermostatic element and valves, whereby fluid of predetermined temperatures may be discharged from the mixing chamber, or both of said valves opened or closed as desired.

6. A valve of the character described having, in combination, a mixing chamber provided with inlet passages for relatively hot and cold fluids and a discharge passage for a mixture of the same, a valve for each inlet passage, a carrier slidably mounted in said chamber, an actuating device for one of said valves slidable relatively to said carrier, and a thermostatic element mounted upon the carrier and connected to the other of said valves and also adapted to operate the actuating device and valve associated therewith.

7. A valve of the character described having, in combination, a mixing chamber provided with inlet passages for relatively hot and cold fluids and a discharge passage for a mixture of the same, a valve for each inlet passage, a thermostatic element within said chamber adapted to actuate both of said valves, and means to control the operation of said thermostatic element whereby fluid of predetermined temperatures may be discharged from the mixing chamber, or both of said valves opened or closed as desired.

8. A valve of the character described having, in combination, a mixing chamber provided with inlet passages for relatively hot and cold fluids and a discharge passage for a mixture of the same, a valve for each inlet passage, a carrier slidably mounted in said chamber, an actuating device for one of said valves also slidably mounted in the chamber and yieldable relatively to said carrier, and a thermostatic element mounted upon the carrier and operatively connected to the other of said valves and also adapted to operate the actuating device and valve associated therewith.

9. A valve of the character described having, in combination, a mixing chamber provided with inlet passages for relatively hot and cold fluids and a discharge passage for a mixture of the same, a valve for each inlet passage, a carrier slidably mounted in said chamber, automatic means mounted upon said carrier adapted to actuate both of said valves, and means to position said carrier whereby fluid of predetermined temperatures may be discharged from the mixing chamber or both of said valves opened or closed as desired.

10. A valve of the character described having, in combination, a mixing chamber provided with inlet passages for relatively hot and cold fluids and a discharge passage for a mixture of the same, a valve for each inlet passage, a carrier slidably mounted in said chamber, an actuating device for one of said valves slidable relatively to said carrier, a thermostatic element mounted upon the carrier and operatively connected to the other of the valves and also adapted to operate the actuating device and valve associated therewith, and means to vary the position of the thermostatic element whereby fluid of predetermined temperatures may be discharged from the mixing chamber.

11. A valve of the character described having, in combination, a mixing chamber provided with inlet passages for relatively hot and cold fluids and a discharge passage for a mixture of the same, axially aligned valves for said inlet passages, a carrier slidably mounted in said chamber, an actuating device for one of said valves also slidably mounted in the chamber and yieldable relatively to said carrier, and a thermostatic element mounted upon the carrier and operatively connected to the other of said valves and also adapted to operate the actuating device and valve associated therewith.

12. A valve of the character described having, in combination, a mixing chamber provided with inlet passages for relatively hot and cold fluids and a discharge passage for a mixture of the same, axially aligned valves for said inlet passages, a carrier slidably mounted in said chamber, an actuating device for one of said valves also slidably mounted in the chamber and yieldable relatively to said carrier, a thermostatic element mounted upon the carrier and operatively connected to the other of said valves, said thermostatic element being positioned in axial alignment with both of the valves and being adapted to operate the actuating device and valve associated therewith, and means to vary the positions of the carrier, thermostatic element and actuating device within the mixing chamber, whereby fluid of predetermined temperatures may be discharged from the mixing chamber.

13. A valve of the character described having, in combination, a mixing chamber provided with inlet passages for relatively hot and cold fluids and a discharge passage for a mixture of the same, a valve for each inlet passage, a carrier slidably mounted in said chamber, an actuating device for one of said valves also slidably mounted in the chamber, a spring interposed between said carrier and actuating device, a thermostatic element mounted upon the carrier and operatively connected to the other of said valves and also adapted to operate the actuating device and valve associated therewith, a cam engaging the carrier, and means to actuate said cam to vary the position of the carrier and thermostatic element mounted thereon.

14. A valve of the character described having, in combination, a mixing chamber provided with inlet passages for relatively hot and cold fluids and a discharge passage for a mixture of the same, a valve for each inlet passage, guides in said chamber, a carrier slidably mounted upon said guides, an actuating device for one of said valves slidably mounted upon said guides and also slidable upon said carrier, a compression spring interposed between the carrier and actuating device, a thermostatic element mounted upon the carrier and operatively connected to the other of said valves and also adapted to operate the actuating member and valve associated therewith, a cam engaging the carrier, and means to actuate said cam to vary the position of the carrier and thermostatic element mounted thereon.

FRANCIS L. HENNING.